(No Model.)
J. FINDLAY.
HOSE CONNECTION.
No. 306,473. Patented Oct. 14, 1884.
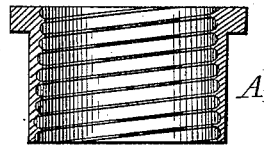
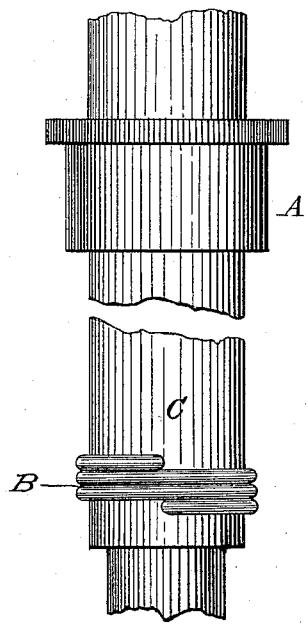
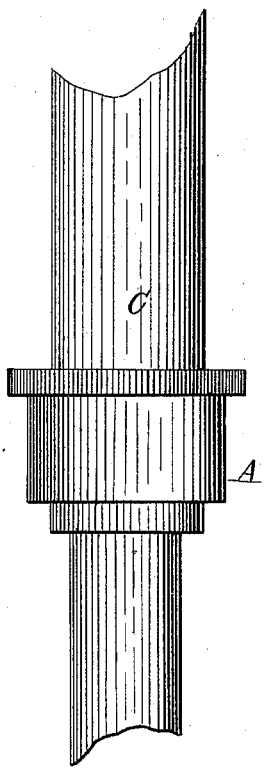
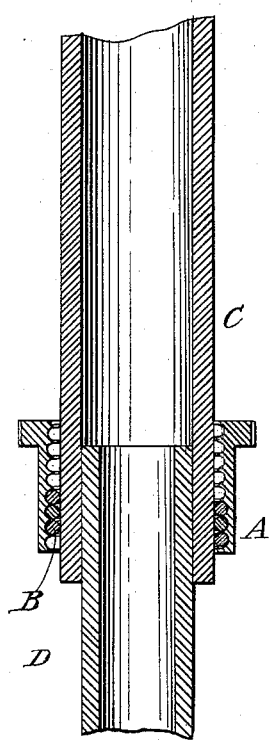
Witnesses:
John Armstrong
Walter McIntosh
Inventor.
James Findlay

UNITED STATES PATENT OFFICE.

JAMES FINDLAY, OF TORONTO, ONTARIO, CANADA, ASSIGNOR TO JAMES H. McNAIRN, OF SAME PLACE.

HOSE-CONNECTION.

SPECIFICATION forming part of Letters Patent No. 306,473, dated October 14, 1884.

Application filed January 22, 1883. (No model.)

*To all whom it may concern:*

Be it known that I, JAMES FINDLAY, a subject of the Queen of Great Britain, residing at Toronto, in the county of York, Province of Ontario, Dominion of Canada, machinist, have invented a new and useful Hose-Connection, (which has not been patented as yet in any country,) of which the following is a specification.

My invention relates to improvements in hose-connections in which a graduated or tapering nut operates in conjunction with a metallic thread. The nut with its decreasing diameter can be screwed thereon with any degree of tightness required. This metallic thread is simply a coil of wire of the diameter of the thread on the nut. I attain these objects by the mechanism illustrated in the accompanying drawings, in which—

Figure 1 is a hose-connection formed; Fig. 2, a section of nut and thread; Fig. 3, the thread or coil on the hose with the nut above ready to be screwed home; Fig. 4, a section of the connection.

Similar letters refer to similar parts throughout the several views.

The graduated or contracting nut is marked A, the wire-coil metallic thread B, the hose C.

The method of operating will be easily understood by the drawings. The nozzle, rose, or other attachment, D, is inserted in the hose. The coil B is placed on the hose. The nut A is screwed tightly on the thread or coil B, which firmly clasps the hose to the nozzle or other insertion.

I am aware that contracting nuts have heretofore been made; but

What I claim as an entirely new, useful, and effective device, and which I desire to secure Letters Patent for, is—

The combination of the contracted nut A and wire-coil B with hose C and attachment D, as and for the purposes set forth.

JAMES FINDLAY.

Witnesses:
JOHN ARMSTRONG,
WALTER McINTOSH.